United States Patent [19]

Takahashi

[11] 4,326,705
[45] Apr. 27, 1982

[54] ORIGINAL SHEET CIRCULATION APPARATUS OF COPYING MACHINE

[75] Inventor: Yasuhiro Takahashi, Tokyo, Japan

[73] Assignee: Ricoh Company, Ltd., Tokyo, Japan

[21] Appl. No.: 123,009

[22] Filed: Feb. 20, 1980

[30] Foreign Application Priority Data

Feb. 27, 1979 [JP] Japan ................................. 54-22108

[51] Int. Cl.³ ...................... B65H 3/44; B65H 29/60
[52] U.S. Cl. ........................................ 271/9; 271/301
[58] Field of Search ..................... 271/3.1, 9, 225, 301

[56] References Cited

U.S. PATENT DOCUMENTS

| 3,476,382 | 11/1969 | Tregay | 271/301 X |
| 3,684,280 | 8/1972 | Samuels | 271/301 |
| 3,770,348 | 11/1973 | Martin | 271/301 X |

Primary Examiner—Richard A. Schacher
Attorney, Agent, or Firm—Wyatt, Gerber, Shoup, Scobey & Badie

[57] ABSTRACT

An original sheet circulation apparatus of a copying machine comprising an original sheet circulation route formed by two guide plates, which is capable of circulating one original sheet in repetition when multiple copies are made from one original, so as to connect an original sheet inlet portion and an original sheet outlet portion of the copying machine. When a desired number of copies are made from each original sheet, each original is held in the original sheet circulation route by a stopper member or stacked on an original sheet stacking portion disposed on the original sheet circulation route by a sheet transportation change-over means. The original sheet circulation apparatus is detachable from the copying machine.

4 Claims, 2 Drawing Figures

ORIGINAL SHEET CIRCULATION APPARATUS OF COPYING MACHINE

BACKGROUND OF THE INVENTION

The present invention relates to an original sheet circulation apparatus of copying machines.

In a diazo copying machine and the like, an original sheet and a photosensitized paper are superimposed on each other and are then inserted into a sheet inlet portion of the diazo copying machine and are exposed to light to form a latent image on the photosensitized paper. The latent image bearing photosensitized paper is then separated from the original sheet and the latent image is then developed so that a copy of the original is obtained, while the original sheet is recovered into a predetermined section of the copying machine. In the copying machines of this type, when multiple copies are made from one original, the original sheet is superimposed on a new photosensitized paper each time the original sheet is discharged from an original sheet outlet portion of the copying machine, and both the original sheet and the new photosensitized paper are again inserted into the above-mentioned sheet inlet portion.

In contrast with a low class copying machine of the above-mentioned type, a conventional high class copying machine is provided with an original sheet circulation apparatus which is capable of circulating the original sheet automatically for making multiple copies from the original sheet once the original sheet is inserted into the copying machine. However in the conventional high class copying machines, a comparatively large original sheet circulation apparatus is built in the copying machine, and its mechanism is rather complicated due to the use of a negative pressure suction apparatus and sheet transportation belts. Therefore, the conventional high class copying machine tends to become over-sized and expensive.

SUMMARY OF THE INVENTION

It is therefore an object of the invention to provide an original sheet circulation apparatus for use in copying machines, which is simple in the construction and less expensive and can be attached to and detached from a copying machine, in the form of a unit, and can attain the same performance as that of the conventional high class copying machine provided with the conventional original sheet circulation apparatus. Furthermore, the original sheet circulation apparatus according to the invention can be attached to copying machines which are not provided with any original sheet circulation apparatus. The original sheet circulation apparatus according to the invention can be manufactured apart from a copying machine to which the original sheet circulation apparatus is to be attached.

In one embodiment of the invention, a original sheet circulation route is built in the original sheet circulation apparatus, and when an original is fed into an exposure section of a copying machine from an original sheet feeding section and is then discharged from the exposure section, the discharged original sheet is fed back into the original sheet circulation route in order to make multiple copies from the same original sheet. This original sheet circulation apparatus is detachable from the copying machine. Furthermore, in the original sheet circulation apparatus, there is disposed a stop member at an inlet portion of the original sheet circulation route and when multiple copies are made from the original sheet, the stop member is opened so as to allow the original sheet to pass through the original sheet circulation route in repetition and when a desired number of copies are made from the original, the stop member is closed to stop the original sheet and to hold the same within the original sheet circulation route. This original circulation route can be opened so that the original can be taken out from the original circulation route.

In another embodiment of the invention, when multiple copies are made from an original sheet, the original sheet is circulated through an original circulation route and whenever a desired number of copies are made from each original sheet, each original sheet is guided into a sheet stacking section disposed above the original circulation route by a sheet transportation direction change-over means, which is operated in accordance with a set number of copies from each original sheet. The original sheet stacking section can be opened so that stacked original sheets can be taken out therefrom.

DESCRIPTION OF THE PREFERRED EMBODIMENTS

Figure 1:
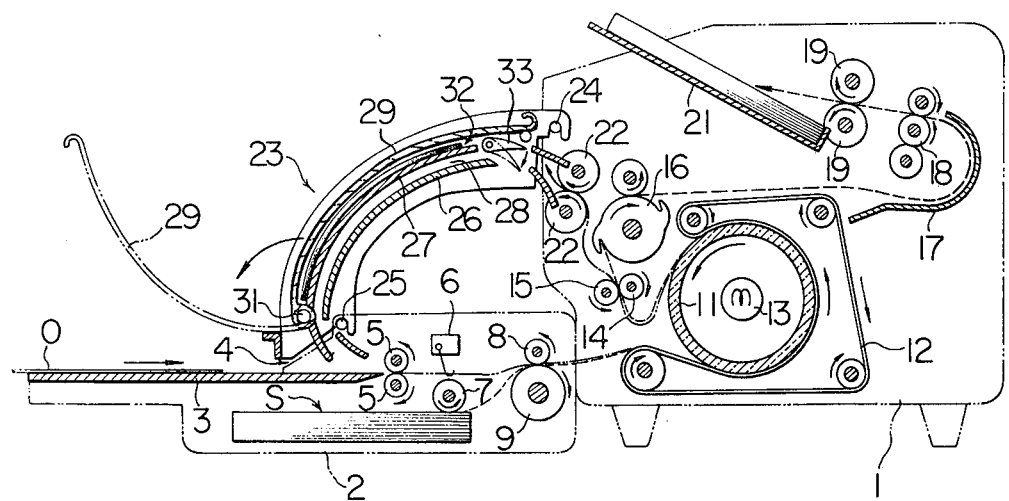
FIG. 1 is a diagrammatical sectional view of a diazo copying machine which is suitable for adopting the invention and an embodiment of the invention, which is attached to the diazo copying machine together with a sheet feeding apparatus.

FIG. 1 shows a diazo copying machine which is suitable for adopting the invention and to which an embodiment of the invention is attached together with a sheet feeding apparatus. In FIG. 1, in front of a diazo copying machine 1, there is disposed a sheet feeding unit 2 for feeding an original sheet O and a photosensitized copy sheet S into an exposure station of the copying machine 1. When the original sheet O is inserted, with its image side up, into an original sheet inlet 4 along a table 3, the original O is transported by a pair of sheet feeding rollers 5, which are rotated in the directions of the respective arrows. With a further transportation of the original O, a micro switch 6 is actuated by the leading edge of the original O, and a photosensitized sheet feeding roller 7 is caused to make predetermined revolutions in accordance with an operation signal generated by the actuation of the micro switch 6, so that the top sheet from a stack of photosensitized sheets S which are placed face-up is transported toward feed rollers 8, 9.

On the other hand, the original O is continuously transported after actuating the microswitch 6, and the leading edges of both the original O and photosensitized sheet S are caused to meet with each other at the feed rollers 8, 9 and they are superimposed on each other and their respective leading edges are aligned, so that the sheets O and S are transported into an exposure section between a transparent exposure cylinder 11 and an endless belt 12. The sheets O and S are moved together with the exposure cylinder 11 and the endless belt 12, while they are supported between the exposure cylinder and the endless belt 12, while exposure is performed by a light source tube 13 and a latent image is formed on the photosensitized sheet S.

The original sheet S and photosensitized sheet S are discharged from between the exposure cylinder 11 and endless belt 12 and are then shifted from each other by a pair of shifting rollers 14, 15, so that the leading edge of the sheet S is caught by a sheet separation rotating plate 16 and the photosensitized sheet S is transported towards a guide plate 17. The sheet S is transported along the guide plate 17 and is then developed while it is caused to pass through development rollers 18. The sheet S is stacked on a copy tray 21 by a pair of sheet discharge rollers 19. On the other hand, the original sheet O is fed into an original sheet circulation apparatus 23 by a pair of original sheet discharge rollers 22.

The original sheet circulation apparatus 23 is attached to the copying machine 1 and the sheet feeding unit 2 by pins 24, 25, which are respectively secured to the copying machine 1 and the sheet feeding unit 2. The original sheet circulation apparatus 23 can be also detached by upward movement from the copying machine 1 and the sheet feeding unit 2 through the pins 24, 25. The sheet circulation apparatus 23 can be attached to the copying machine 1 and the sheet feeding unit 2 by use of bolts and nuts. Inside the sheet circulation apparatus 23, there are disposed curved guide plates 26, 27, which form an original circulation route 28 between them. The original sheet O is caused to pass through the original sheet circulation route 28 and when the original sheet O is discharged from the sheet circulation route 28, it is caught by the sheet feeding rollers 5 and is again directed to the exposure station of the copying machine 1. When multiple copies are made from one original, the original sheet O is circulated in the sheet circulation route 28 in the above-mentioned manner.

In order to transport the original sheet within the sheet circulation route 28 more smoothly, sheet transfer rollers or sheet transfer belts can be disposed within the original sheet circulation route 28. Furthermore, when large originals which are comparatively hard but flexible are used, they can be transported by utilizing their hardness and flexibility, without disposing the lower guide plate 26.

Referring to FIG. 1, reference numeral 29 represents an original collecting guide plate which is made of a transparent material whose base portion hinges on a shaft 31. Between the original collecting guide plate 29 and the guide plate 27, there is formed an original stacking portion 32. In the copying machine as shown in FIG. 1, the number of copies is set by a preset counter apparatus and when a desired circulation cycle of an original sheet is finished, a solenoid (not shown), which is connected to a sheet path changing member 33 disposed at an inlet portion of the original sheet circulation route 28, is energized by a command from the preset counter apparatus, and the sheet path changing member 33 is moved to a position indicated by the imaginary lines, so that the original sheet O discharged from the original sheet discharge rollers 22 is guided along the sheet path changing member 33 to the original sheet stacking portion 32 and is stacked thereon. When a plurality of originals are employed, they are stacked there in the correct order. The original collecting guide plate 29 can be simply opened to a position indicated by the imaginary lines and can be closed to a position indicated by the solid lines. Therefore, original sheets can be taken out from the original sheet stacking portion 32 without any difficulty. Furthermore, since the original collecting guide plate 29 is made of a transparent material, the stacked original sheet are visible to the operator.

Figure 2:
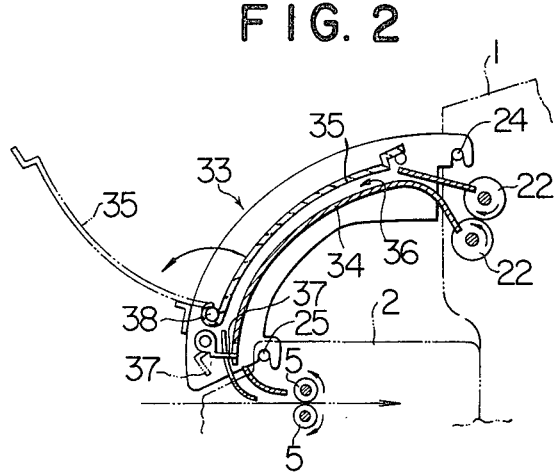
FIG. 2 is a diagrammatical section view of another embodiment of the invention.

Referring to FIG. 2, there is shown another embodiment of the invention, which is represented by numeral 33. The original sheet circulation apparatus 33 is provided with a guide plate 34 and an original collecting guide plate 35, which form an original sheet circulation route 36 between them. At an outlet of the sheet circulation route 36, there is disposed a stop member 37, which is normally positioned at a position indicated by the imaginary lines so as not to be in the way of the transportation of original sheets. When an original sheet is inserted between the sheet feeding rollers 5 and exposure is performed, the original sheet is transported into the sheet circulation route 36 after having passed through the original sheet discharge rollers 22, so that the sheet O is circulated by the number of times equal to a number of copies set by the previously mentioned preset counter.

When a final circulation of the original sheet is finished, a solenoid (not shown) which is connected to the stop member 37 is energized in accordance with a command from the preset counter apparatus, so that the position of the stop member 37 is switched to a position indicated by the solid lines in FIG. 2. The original sheet, passing through the sheet circulation path 36, is stopped by the stop member 37 and stacked within the original sheet circulation route 36. The original collecting guide plate 35 hinges on a shaft 38 and is made of a transparent material.

The original collecting guide plate 35 can be simply opened to a position indicated by the imaginary lines and closed to a position indicated by the solid lines. Therefore, original sheets can be taken out from the original stacking portion 36 without any difficulty. Furthermore, since the original collecting guide plate 35 is made of a transparent material, the stacking section of original sheets is visible to the operator. When the next original sheet is copied, the stop member 37 is moved to the position indicated by the imaginary line.

What is claimed is:

1. In an apparatus for selectively recirculating an original through a copying machine having an inlet for receiving the original to be copied, means for receiving said original and aligning it in superimposed relation with a copy sheet, means for transporting said superimposed original and copy sheet in unison past an exposure station, and means for separating said original from said copy sheet and directing said copy sheet to a receiving station and said original to an outlet, the original recirculating apparatus including means for removably attaching it as a unit to said copying machine, a chamber positionable adjacent said outlet for receiving originals exiting from said copying machine and selection means positioned adjacent said chamber for alternatively retaining an original in said chamber or directing it back to the inlet of the copy machine until the desired number of copies of the original are produced.

2. An apparatus according to claim 1, said chamber including an outer wall surface connected pivotally at one end thereof to enable it to be swung open to gain access to originals stacked in said chamber.

3. An apparatus according to either claim 1 or 2, said chamber defining a passageway between the outlet receiving originals from the copying machine and the inlet for receiving the originals, and said selection means including a stop member positionable within said passageway for retaining originals therein and removable from said passageway to enable originals to be passed therethrough for recirculation through the copying machine.

4. An apparatus according to either claim 1 or 2, said chamber extending between the outlet receiving originals from the copying machine and the inlet for receiving the originals, said chamber being divided longitudinally into a first section having a closed end for retaining originals and a second section forming a passageway between said outlet and said inlet, and further including means positioned near the side of said chamber adjacent said outlet for selectively directing originals exiting from said outlet to either said first section or said second section.

* * * * *